No Printed Specification Available
9418X
S. Ladd.
Spinning Flyer.
Patented Feb. 20, 1836.
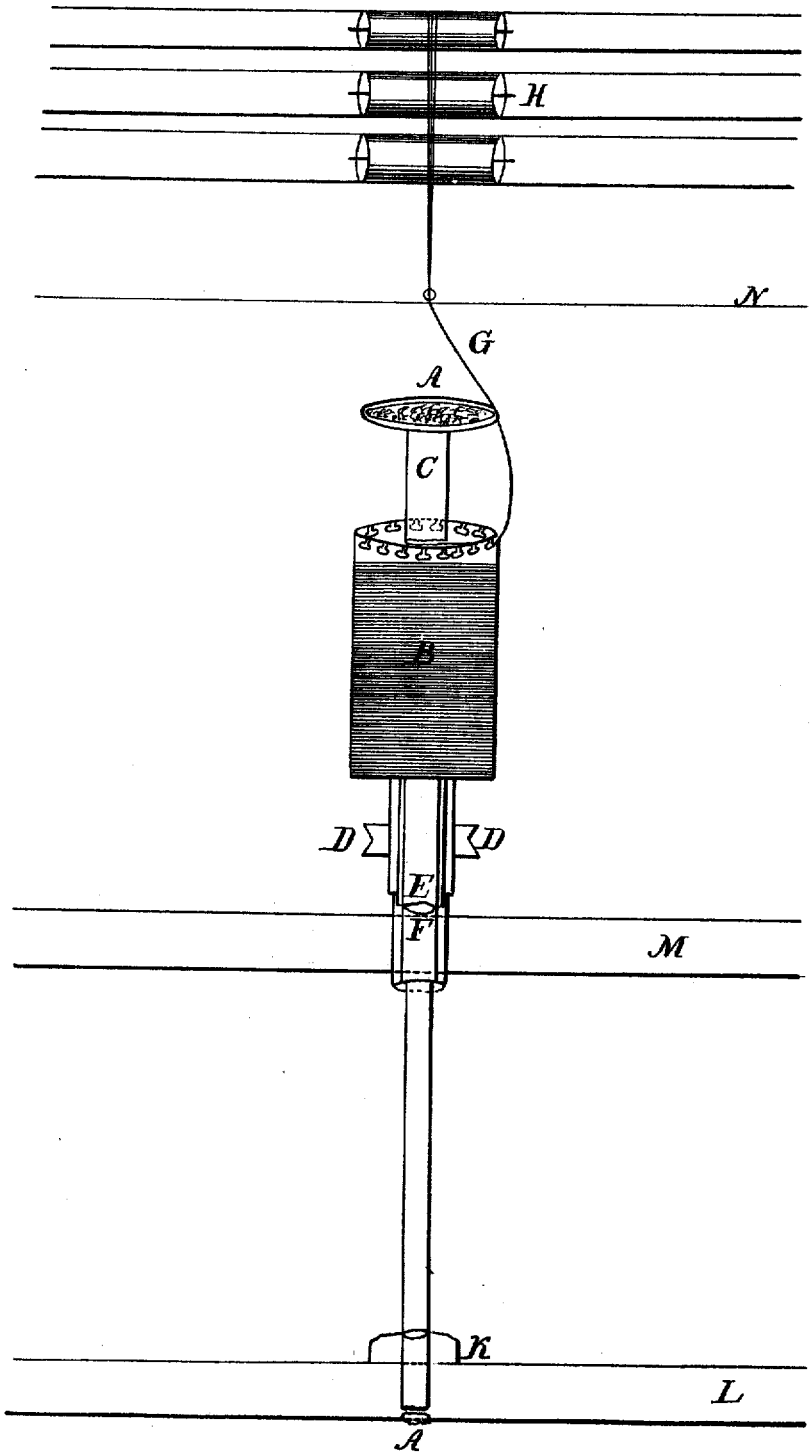
N. PETERS, PHOTO-LITHOGRAPHER, WASHINGTON, D. C.

Samuel Ladd of Waltham Massachusetts

Letters Patent.

The schedule referred to in these Letters Patent and making part of the same containing a description in the words of the said Samuel Ladd himself of his improvement in the Hollow cylindrical Flyer for Spinning.

To all to whom these presents shall come
Be it known that I Samuel Ladd of Waltham in the County of Middlesex and State of Massachusetts, have invented a new and useful improvement in the method of manu-facturing yarn and thread with the use of hollow cylindrical flyers and that the following is a full and exact descrip-tion thereof, The drawing numbered 1 hereto annexed repre-sents the machinery used for manufacturing yarn & thread The part of the drawings Nos A.A, is a perpendicular spin-dle around which the hollow cylindrical flyer, revolves B represents the flyer D,D the whirl to receive the band or belt which causes the flyer to revolve E. the part contiguous to the Spindle called the bushing with which the flyer revolves F a cylindrical tube on which the bushing rests, G repre-sents the yarn or thread passing down from the roving through the rollers H.H. and the guide N. N. also through the side of the flyer, on the spool C, M.M, is a stationary rail in which the tube F is fixed. L.L. is a moveable rail to let rise and fall the spool C, and K is a [illegible] to keep the spindle in its place
What I claim as my own invention and not previously known in the above described machine is the part marked B. Styled Ladds Patent Hollow, cylindrical Flyers. The advantage of 370. 9418X of the above named flyer are over those now in use are that
the cylindrical flyer revolve without any impediment from the
wind and protect the yarn or threads from dust, and the sa[illegible]
power will drive the cylindrical flyer with greater speed
than any other kind now in use, which cylindrical flyer, [illegible]
made of wood or metalick substance ——

Witnesses
Arad Moore }
Saml. Perry. }

Samuel Ladd,

[illegible]
M.J.C. Drawings [oo Dwgs